Patented Apr. 2, 1940

2,195,788

UNITED STATES PATENT OFFICE 2,195,788

COMPLEX METAL COMPOUNDS OF AZO DYESTUFFS

Max Schmid, Riehen, Switzerland, assignor to the firm Society of Chemical Industry in Basle, Basel, Switzerland No Drawing. Original application November 2, 1936, Serial No. 108,902. Divided and this application February 4, 1938, Serial No. 188,805. In Switzerland November 6, 1935

12 Claims. (Cl. 260—147)

This application is a division of my application Serial No. 108,902, filed in the United States on November 2, 1936, and in Switzerland on November 6, 1935.

This invention relates to new dyestuffs obtained from new intermediate products which are obtained themselves by converting by known methods into the corresponding hydrazine a compound of the general formula

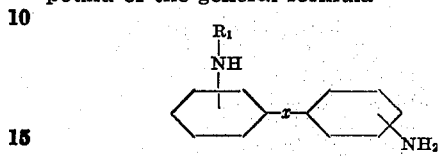

in which $x$ is a diphenyl linking or a bridge such as —O—, —S—, —CH=CH—, —CH₂—CH₂—, —CH₂—, —NH—,

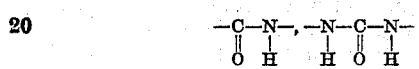

or a heterocyclic ring such as

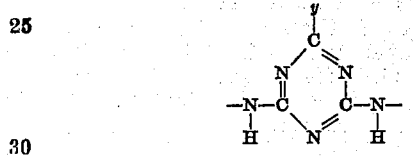

($y$=hydrogen or any substituent)

and the like, and R₁ is the residue of an organic acid, and condensing in known manner, after saponifying the radical of the organic acid, if this is present, with a suitable keto-compound to produce a pyrazolone capable of being coupled.

The new compounds, which correspond with the general formula

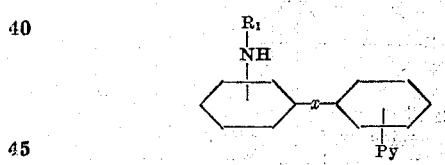

in which $x$ has the meaning ascribed to it above, R₁ stands for hydrogen or a radical of an organic acid and Py represents the pyrazolone radical, can be converted into new azo-dyestuffs either by coupling them with diazo-compounds or by saponifying any radical of an organic acid that may be present, then diazotizing and coupling with coupling components or by using both reactions together.

The new azo-dyestuffs are characterized by the presence of the atom grouping

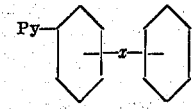

in which Py and $x$ have the meaning ascribed to them above and in which at least one azo-group is attached either to the pyrazolone radical or to the benzene nucleus which is not directly bound to the pyrazolone nucleus. They are particularly suitable for dyeing textiles consisting of or containing native or regenerated cellulose. The fastness of the dyeing may in many cases be improved by after-treatment with agents yielding metals, whereby metal complexes are formed on the fiber. Such metal complexes may be produced also in the dye-bath, in substance, or during the formation of dyestuff.

As parent substances for compounds of the general formula

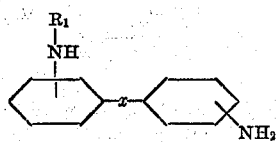

there may be mentioned benzidine, diphenyline of the formula

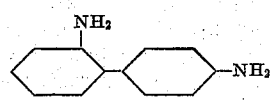

tolidine, dianisidine, diphenetidine, thioaniline, 4:4'-diamino-diphenyl ether, 4:4'-diaminostilbene, 4:4'-diaminodibenzyls, 4:4'- or 3:3'-diaminodiphenylmethane, 4:4'-diaminodiphenylamines, 4:4'- or 4:3'- or 3:4'- or 3:3'-diaminobenzoylaniline, 4:4'-diaminodiphenyl urea, the condensation product from 2 or 3 mol metaphenylenediamine or para-phenylenediamine and 1 mol cyanuric chloride or the condensation product from 1 mol cyanuric chloride, 1 mol aniline and 2 mol para-phenylenediamine or metaphenylenediamine or similarly constructed condensation products in which the cyanuric ring is replaced by similar six-membered hetero rings containing carbon and nitrogen, such as those of the pyrimidine, the quinazoline, the phthalazine, and the like, which corresponds to products in which the linkage $x$ can be formulated for example as

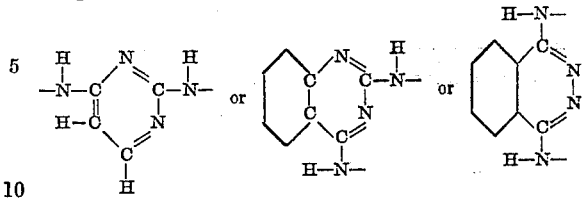

Compounds of the general formula

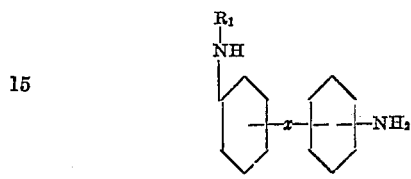

are therefore, for example, monoformylbenzidine, monoacetylbenzidine, monobenzoylbenzidine, 4- or 3-acetylamino-1-(4'- or 3'-amino)-benzoylaminobenzene, 4-amino-1-(4'- or 3'-acetylamino)-benzoylaminobenzene-3-sulfonic acid, products obtained by monobenzoylation or monoacetylation from the reduced condensation products from 1 mol urea chloride or isocyanate from para- or meta-nitraniline and 1 mol 1:4-diaminobenzene-3-sulfonic acid, such as

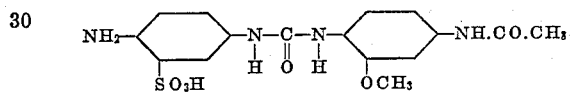

the ternary condensation products from 1 mol 1:4- or 1:3- diaminobenzene-3- or -4-sulfonic acid, 1 mol monoacetyl-para- or meta-phenylenediamine and 1 mol of a primary or secondary amine and 1 mol cyanuric chloride such as

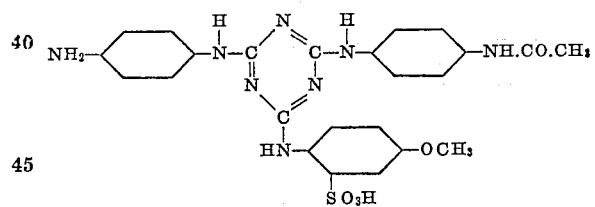

and the like.

As radicals of organic acids may be mentioned inter alia the radicals of formic acid, acetic acid, oxalic acid, benzoic acid, propionic acid or toluene sulfonic acid.

Among the suitable keto-compounds indicated above there may be named ethyl formylacetate, ethyl acetoacetate, ethyl oxalacetate, ethyl benzoylacetate or another ethyl aroylacetate, also ethyl aroyldiacetate, for instance ethyl terephthaloyldiacetate.

From the above disclosed starting materials there are derived the products which correspond with the aforesaid general formula

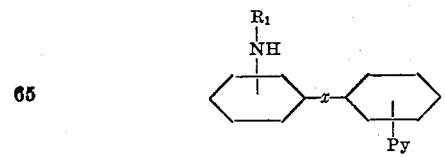

Such pyrazolones are, for example, the following:

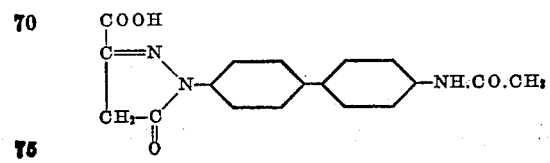

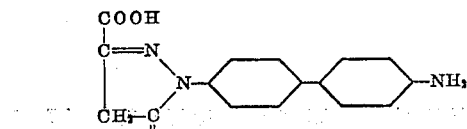

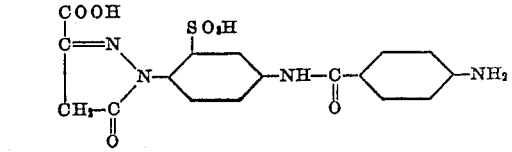

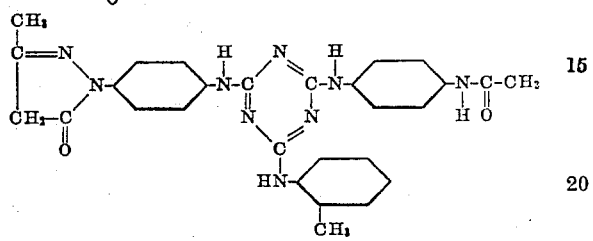

and so on, as indicated in the fifth paragraph of this specification.

Among the diazo-compounds which may be coupled with such products there must first be named the simple diazo-compounds, such as diazobenzene, diazonaphthalene, diazotoluene, diazoanisole, diazophenetole, diazotized aminoazobenzene or the like and sulfonic acids of them. Of particular interest are, however, the diazo-compounds which have in ortho- or peri-position to the diazo-group a hydroxyl group or a carboxyl group. Such diazo-compounds are, for example, those of ortho-aminophenols, orthoaminonaphthols and their sulfonic acids, the diazo-compounds of 1:8-aminonaphthol sulfonic acids, also of ortho-aminocarboxylic acids, for instance anthranilic acid. With the aid of such compounds dyestuffs are obtained which can be converted into valuable metal compounds on the fiber or in substance by means of agents which yield metal, for instance copper salts, chromium salts or hydroxides of these metals.

Of these dyestuffs those are of especial value which are obtained by treating with copper on the fiber or in substance the azo-dyestuffs which are themselves obtained by coupling the intermediate product of the general formula

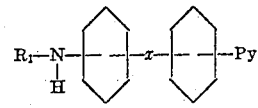

with a diazotized ortho-amino-carboxylic acid of the benzene series. These new dyestuffs are therefore the copper compounds of dyestuffs of the general formula

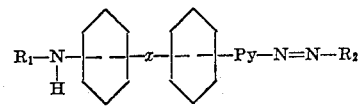

in which $R_2$ stands for an aromatic nucleus of the benzene series which carries a COOH-group in ortho-position to the —N=N— group.

Among the coupling components which may also be coupled with the diazotized compounds of the general formula

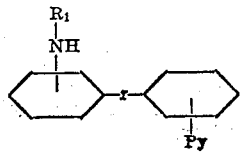

in which the pyrazolone radical may be already coupled with a diazo-compound and in which R₁ stands for hydrogen, there may be named compounds like phenols, naphthols, aminonaphthols and their sulfonic acids and acidyl derivatives. Specific products are, for example, para-cresol, resorcinol, β-naphthol and its sulfonic acids, the sulfonic acids of α-naphthol which couple in 2-position, aminonaphthol sulfonic acids such as 2-amino-5-hydroxynaphthalene-7-sulfonic acid, 2-amino-8-hydroxynaphthalene-6-sulfonic acid, 1-amino-8-hydroxynaphthalene-4:6-disulfonic acid, 1-amino-8-hydroxynaphthalene-3:6-disulfonic acid (acid or alkaline coupling), 2:3-hydroxynaphthoic acid, 1-acidylamino-8-hydroxynaphthalene sulfonic acid, amines such as meta-phenylenediamine, β-naphthylamine, alkyl-β-naphthylamine and their sulfonic acids, azo-dyestuffs capable of coupling, and the like.

The dyestuffs obtained by the invention may, as already stated, especially be used for dyeing vegetable fibers. They may also be used with a like result for dyeing regenerated cellulose, for instance, viscose or copper silk. Should the new dyestuffs contain suitable substituents they may be diazotized on the fiber and developed by further coupling components or by treatment with a diazo-compound. When the dyestuffs have been made with the aid of ortho-aminophenols, ortho-aminocarboxylic acids or their esters or ethers, or when they contain the salicylic acid grouping or other lake-forming groups of atoms they are capable of conversion into metal compounds. Suitable metals coming into question besides the copper and chromium already mentioned are nickel, cobalt, iron, zinc or the like. The metal compounds may be obtained either on the fiber or in substance.

The new azo-dyestuffs obtainable according to the present process correspond to the general formula

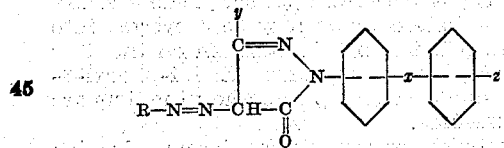

in which R stands for a nucleus selected from the group consisting of aromatic nuclei of the benzene and naphthalene series, y stands for a member of the group consisting of H, methyl, phenyl, COOH and COO— alkyl, x stands for a member of the group of linkages consisting of a diphenyl linkage, —O—, —S—, —CH=CH—, —CH₂—CH₂—, —CH₂—, —NH—,

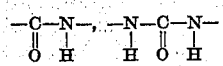

and a heterocyclic six-membered ring consisting of at least 3 and not exceeding 4 carbon atoms, and at least 2 and not exceeding 3 nitrogen atoms, not more than 2 nitrogen atoms standing adjacent to each other, which ring further contains at least twice and not more than three times the atom grouping

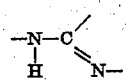

wherein the

group does not belong to the heterocyclic radical, and z stands for a member of a group of substituents linked to the benzene nucleus by N— atoms and consisting of a member of the group consisting of —N=N—R₁, R₁ standing for an aromatic nucleus from the group consisting of aromatic nuclei of the benzene and naphthalene series, and

R₂ standing for the radical of an organic acid, which dyestuffs are yellow to brown and black powders dissolving in water to yellow to orange, to brown to blackish and to green solutions, and dyeing the fiber similar tints of good fastness.

The following examples illustrate the invention, the parts being by weight:

Example 1

22.6 parts of finely ground monoacetyl-benzidine are stirred in 50 parts of water and some ice with 30 parts of hydrochloric acid of specific gravity 1.15. Into this mixture there is dropped slowly at 0–10° C. a solution of 7 parts of sodium nitrite in about 20 parts of water and when the addition of this nitrite is complete the whole is stirred for about 1 hour and then filtered.

The filtered diazo-solution is run at 0–5° C. while stirring well into an externally cooled mixture of 100 parts of stannous chloride of about 63 per cent. strength and 50 parts of hydrochloric acid of specific gravity 1.15.

The hydrazine thus formed is sparingly soluble. After stirring for about 12 hours the mixture is filtered and the solid matter washed with dilute hydrochloric acid and then with water. By stirring this solid matter, if desired after separation of the tin, with dilute alkali the free hydrazine of the formula

is obtained. From alcohol it crystallizes in the form of bright yellow needles of melting point 227° C. Alternatively the filtered diazo-solution is run whilst stirring into a mixture of 632 parts of bisulfite liquor of 40 per cent. strength, 30 parts of sodium carbonate and 50 parts of caustic soda solution of 36° Bé. Stirring is continued during the night and the product is salted out and filtered. The filter cake is stirred into 2000 parts of water and after addition of 60 parts of acetic acid the whole is heated to boiling. There are then added gradually about 60 parts of zinc dust and boiling is continued until the mass is decolorized. After filtering hot the hydrazine sulfonic acid of the formula

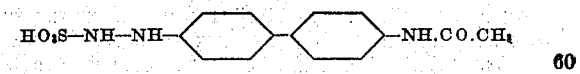

is salted out from the cool filtrate.

The hydrazine sulfonic acid can be converted into the hydrochloride of the hydrazine base by treatment with hydrochloric acid.

In like manner products can be prepared from the parent materials indicated in the 5th paragraph of this specification.

Example 2

The hydrazine hydrochloride of the formula

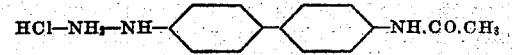

obtainable as described in paragraphs 1–3 of

Example 1 is boiled together with 500 parts of water and 100 parts of hydrochloric acid of specific gravity of 1.15 for about 2-3 hours, whereby the hydrochloride is dissolved. If desired the solution may be treated with sulfurated hydrogen to remove tin, if necessary, filtered and cooled. The large part of the hydrochloride separates and a further quantity may be salted out from the mother liquor or the latter may be treated with alkali to recover the free base.

This base may be recrystallized from alcohol when it forms white crystals of melting point 179° C. which become brown on exposure to air and correspond with the formula

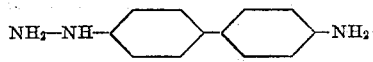

The corresponding product from mono-acetyl-ortho, ortho'-tolidine crystallizes from alcohol in white laminae of melting point 184° C. It has the formula

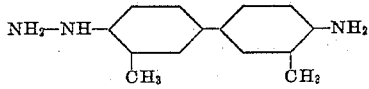

*Example 3*

24.1 parts of the hydrazine of Example 1 are dissolved in about 200 parts of alcohol mixed with some glacial acetic acid. There are then added 14 parts of ethylaceto-acetate and the mixture is boiled for about 1 hour. After cooling there are added to the mixture 20 parts of caustic soda solution of 36° Bé. and the mixture is stirred for 24 hours. By heating the larger part of the alcohol is expelled while water is substituted, the whole is filtered and pyrazolone precipitated by adding acid. It corresponds with the formula

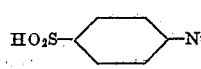

The condensation may also start from the hydrazine hydrochloride and be conducted in aqueous medium. In similar manner products are obtained from the other hydrazines indicated in Example 1. Instead of ethylaceto-acetate any other β-keto-carboxylic acid ester, for instance ethyl benzoyl acetate, terephthaloyl di-acetic ester, ethyl oxal-acetate or the sodium compounds thereof may be used.

*Example 4*

27.2 parts of the hydrazine hydrochloride of Example 2 are suspended in hot water. Condensation follows with 14 parts of ethylaceto-acetate at about 60° C. with gradual neutralization of the acid liberated in the condensation. When the condensation is complete the whole is cooled, made alkaline to phenolphthalein by means of caustic alkali, stirred for 12 hours, heated until everything has been dissolved and finally the pyrazolone precipitated by neutralization. It corresponds with the formula

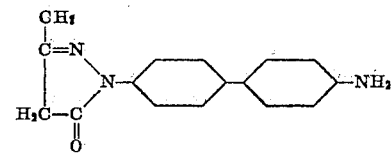

This new product is a white powder of melting point 194° C., soluble in dilute caustic soda solution and dilute mineral acid.

*Example 5*

26.5 parts of 1-phenyl-(4'-phenyl-4''-amino)-3-methyl-5-pyrazolone of the formula

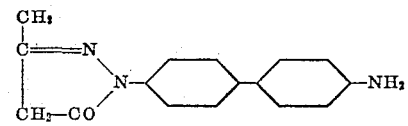

obtainable as described in Example 4 are dissolved in about 500 parts of water containing 10 parts of caustic soda solution of 36° Bé. and 15 parts of calcined sodium carbonate. To the filtered solution is added the diazo-compound from 27.7 parts of aminoazo-benzene-para-sulfonic acid. For completing the coupling the whole is warmed and then the azo-dyestuff of the formula

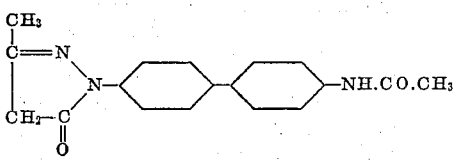

is salted out and separated as usual.

When dry it is a brown powder yielding yellow dyeings on cotton which may be converted into orange to red tints by diazotization on the fiber and developing, for instance with 1-phenyl-3-methyl-5-pyrazolone or β-naphthol; the tints are fast to washing.

If diazotizing components have been used which contain OH, OCH₃ or COOH in ortho-position to the diazo-group, similar products may be obtained by introducing radicals of organic acids into the amino group in 4''-position and if necessary metallizing the dyestuffs.

By application of this example numerous other mono- and polyazo-dyestuffs capable of developement on the fiber may be produced, including dyestuffs in which the amino-group of the diphenyl-radical is diazotized in substance and coupled with such coupling components as yield dyestuffs capable of themselves being further diazotized on the fiber and developed.

*Example 6*

The dyestuff obtainable by coupling 26.5 parts of 1-phenyl-(4'-phenyl-4''-amino)-3-methyl-5-pyrazolone with the diazo-compound from 20.7 parts of 2-chloro-1-aminobenzene-4-sulfonic acid in a medium alkaline with sodium carbonate is dissolved in dilute caustic soda solution and the solution is mixed with 7 parts of sodium nitrite and diazotization produced by pouring the mixture into dilute cold hydrochloric acid.

The separated diazo-compound of the dyestuff acid is filtered and the filter cake is coupled in acetic acid medium with 2-amino-8-hydroxynaphthalene-6-sulfonic acid. When coupling is complete the dyestuff of the formula

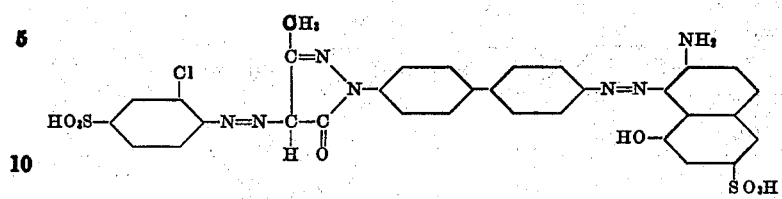

is separated. When dry it is a dark brown powder which dissolves in water to a brown solution and which dyes cotton fast brown tints.

The chloraniline sulfonic acid of this example may be exchanged for any diazotizable aminocompound of the benzene or naphthalene series as well as for such as can form complexes capable of being metallized and also by diazotizable azodyestuffs.

The end component capable of being coupled can be varied and the coupling may also be produced in neutral or alkaline medium. Examples of such dyestuffs are illustrated in the following example.

*Example 7*

The diazo-compound of the dyestuff from diazotized ortho-chloro-sulfanilic acid and 1-phenyl-(4'-phenyl-4''-amino)-3-methyl-5-pyrazolone obtainable as described in paragraph 1 of Example 6 is coupled in a medium alkaline with sodium carbonate with the monoazo-dyestuff obtainable by acid coupling of diazotized 2:4-dichloraniline and 1-amino-8-hydroxynaphthalene-3:6-disulfonic acid.

When dry, the isolated dyestuff of the formula

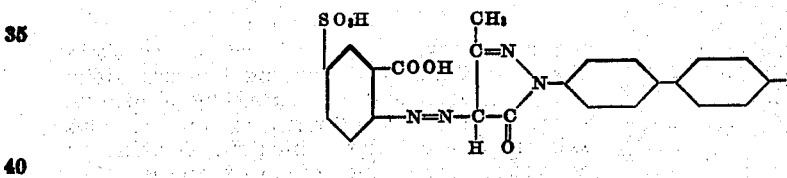

is a greenish black powder which dissolves in water to a green solution and dyes cotton pure strong green tints.

Further products dyeing green may be obtained if the 3-methylpyrazolone is exchanged for the corresponding 3-carboxylic acid or the benzidine radical for tolidine, dichlorobenzidine or the like. Also the yellow pyrazolone constituent and the blue-amino-naphthol constituent of the trisazo-dyestuff may be varied within wide limits. By such changes there are obtained not only green dyestuffs, but also dyestuffs which yield quite different tints. If for example in the pyrazolone constituent the ortho-chloro-sulfanilic acid is replaced by diazotized aminoazo-benzene-sulfonic acid, products are obtained which dye olive tints. Brown dyestuffs which are very fast to light are further obtained when using in the pyrazolone constituent one of the diazotizing components leading to azo-dyestuffs capable of being metallized, and coupling the diazotized and if necessary, already coppered or metallized pyrazolone azo-dyestuff with such azo-dyestuffs capable of coupling which have themselves been obtained by coupling 1 mol of a diazotized diazo-compound, such as aniline, sulfanilic acid, anthranilic acid, ortho-aminophenol-sulfonic acid, sulfo-anthranilic acid, naphthionic acid or 1-amino-2-hydroxynaphthalene-4-sulfonic acid with 1 mol of a compound of the group consisting of resorcin, meta-phenylenediamine, meta-toluylenediamine, meta-aminophenol, naphtho-resorcin, cresorcinol and the like. Those dyestuffs are then particularly valuable which are also metallized in the second part of the molecule, already metallized dyestuffs can then also be used as coupling components. Thus the copper, cobalt, nickel and iron compounds of the dyestuffs of the formula

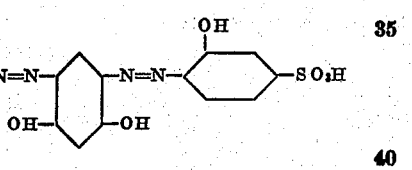

yield on cotton brown tints.

A dyestuff dyeing blackish tints is the azo-dyestuff which is obtained by coupling in an acid medium the diazotized cupriferous dyestuff from diazotized ortho-aminophenol sulfonic acid and 1-phenyl-(4'-phenyl-4''-amino)-3-methyl-5-pyrazolone with 1-amino-8-hydroxynaphthalene-4:6-disulfonic acid, and further coupling the disazo-dyestuff thus obtainable with diazo-benzene in an alkaline medium.

The following data serve as example of a further dyestuff of this group:

26.5 parts of 1-phenyl-(4'-phenyl-4''-amino)-3-methyl-5-pyrazolone of Example 4 are dissolved in about 500 parts of water containing 10 parts of caustic soda solution of 36° Bé. and 15 parts of sodium carbonate. To the filtered solution is added the diazo-compound of 32 parts of dehydrothio-para-toluidine-mono-sulfonic acid. When coupling is complete the dyestuff is salted out and isolated.

This aminoazo-dyestuff is further diazotized and coupled with 37.4 parts of the copper compound of the azo-dyestuff from diazotized 1-oxy-2-aminobenzene-4-sulfonic acid and resorcinol.

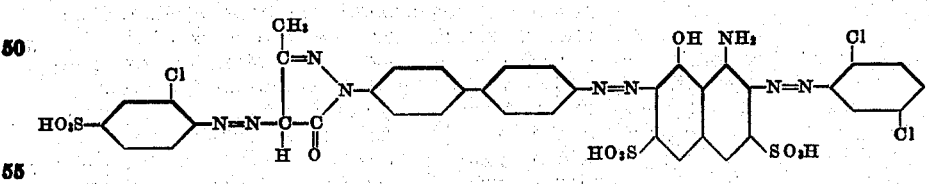

When coupling is complete the cupriferous disazo-dyestuff formed of the probable formula

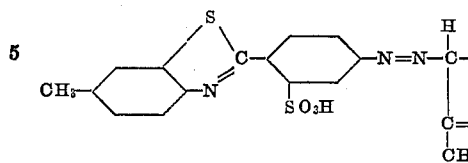

is isolated.

When dry it is a dark brown to black powder which dissolves in water to a brown solution and dyes cotton brown fast tints. The chromium, cobalt, nickel and iron compounds of this dyestuff also yield on cotton brown tints.

What I claim is:

1. The complex metal compounds of the sulfonated asymmetrical azo-dyestuffs containing at least two azo-groups of the general formula

in which R stands for a nucleus selected from the group consisting of aromatic nuclei of the benzene and naphthalene series which is substituted in ortho-position to the —N=N— group by a substituent selected from the group consisting of OH and COOH, $y$ stands for a member of the group consisting of H, methyl, phenyl, COOH and COO— alkyl, $x$ stands for a member of the group of linkages consisting of a diphenyl linkage, —CH=CH—, —CH$_2$—CH$_2$—, —NH—,

and a heterocyclic six-membered ring consisting of at least 3 and not exceeding 4 carbon atoms, and at least 2 and not exceeding 3 nitrogen atoms, not more than 2 nitrogen atoms standing adjacent to each other, which ring further contains at least twice and not more than three times the atom grouping $$\begin{array}{c}-N-C\\|\phantom{-}\diagdown\\H\phantom{-}N-\end{array}$$

wherein the $$\begin{array}{c}-N-\\|\\H\end{array}$$

group does not belong to the heterocyclic radical, and $z$ stands for the group consisting of —N=N—R$_1$(N=N—R$_2$)$_n$, $n$ standing for zero and 1 and R$_1$ and R$_2$ standing for aromatic nuclei from the group consisting of aromatic nuclei of the benzene and naphthalene series, which dyestuffs are soluble in water with formation of yellow to orange, to brown, to blackish and to green solutions, and dyeing the fiber similar tints of good fastness.

2. The complex copper compound of the sulfonated asymmetrical azo-dyestuffs containing

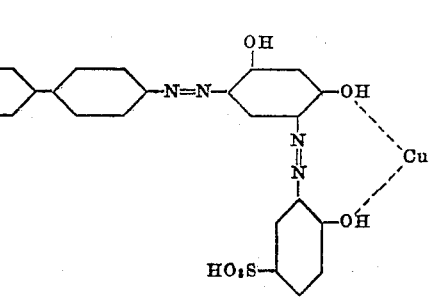

at least two azo-groups of the general formula

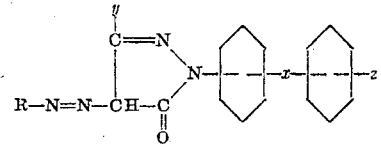

in which R stands for a nucleus selected from the group consisting of aromatic nuclei of the benzene and naphthalene series which is substituted in ortho-position to the —N=N— group by a substituent selected from the group consisting of OH and COOH, $y$ stands for a member of the group consisting of H, methyl, phenyl, COOH and COO— alkyl, $x$ stands for a member of the group of linkages consisting of a diphenyl linkage, —CH=CH—, —CH$_2$—CH$_2$—, —NH—,

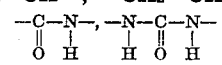

and a heterocyclic six-membered ring consisting of at least 3 and not exceeding 4 carbon atoms, and at least 2 and not exceeding 3 nitrogen atoms, not more than 2 nitrogen atoms standing adjacent to each other, which ring further contains at least twice and not more than three times the atom grouping

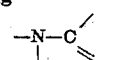

wherein the

group does not belong to the heterocyclic radical, and $z$ stands for the group consisting of —N=N—R$_1$(N=N—R$_2$)$_n$, $n$ standing for zero and 1 and R$_1$ and R$_2$ standing for aromatic nuclei from the group consisting of aromatic nuclei of the benzene and naphthalene series, which dyestuffs are soluble in water with formation of yellow to orange, to brown, to blackish and to green solutions, and dyeing the fiber similar tints of good fastness.

3. The complex metal compounds of the sulfonated asymmetrical azo-dyestuffs containing at least two azo-groups of the general formula

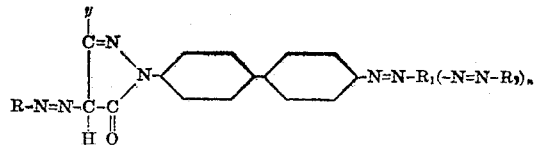

in which $y$ stands for a member of the group consisting of H, methyl, phenyl, COOH and COO— alkyl, R stands for a nucleus selected from the group consisting of aromatic nuclei of the benzene and naphthalene series which is substituted in ortho-position to the —N=N— group by a substituent selected from the group consisting of OH and COOH, $R_1$ and $R_2$ stand for aromatic nuclei selected from the group consisting of aromatic nuclei of the benzene and naphthalene series and $n$ stands for zero and 1, which dyestuffs are soluble in water with formation of yellow to orange, to brown, to blackish and to green solutions, and dyeing the fiber similar tints of good fastness.

4. The complex copper compounds of the sulfonated asymmetrical azo-dyestuffs containing at least two azo-groups of the general formula

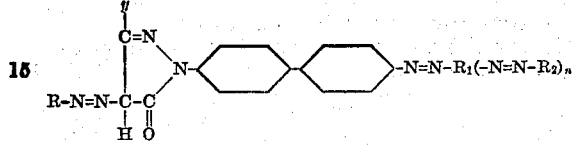

in which $y$ stands for a member of the group consisting of H, methyl, phenyl, COOH and COO— alkyl, R stands for a nucleus selected from the group consisting of aromatic nuclei of the benzene and naphthalene series which is substituted in ortho-position to the —N=N— group by a substituent selected from the group consisting of OH and COOH, $R_1$ and $R_2$ stand for aromatic nuclei selected from the group consisting of aromatic nuclei of the benzene and naphthalene series and $n$ stands for zero and 1, which dyestuffs are soluble in water with formation of yellow to orange, to brown, to blackish and to green solutions, and dyeing the fiber similar tints of good fastness.

5. The complex metal compounds of the sulfonated asymmetrical azo-dyestuffs containing at least two azo-groups of the general formula

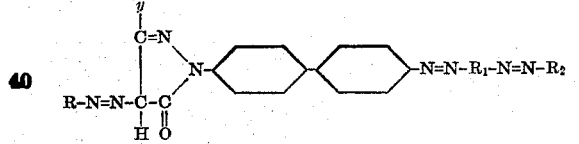

in which $y$ stands for a member of the group consisting of H, methyl, phenyl, COOH and COO— alkyl, R stands for a nucleus of the benzene series substituted in ortho-position to the —N=N— group by a substituent selected from the group consisting of OH and COOH groups, and $R_1$ and $R_2$ stand for aromatic nuclei selected from the group consisting of aromatic nuclei of the benzene and naphthalene series, which dyestuffs are soluble in water with formation of yellow to orange, to brown, to blackish and to green solutions, and dyeing the fiber similar tints of good fastness.

6. The complex copper compounds of the sulfonated asymmetrical azo-dyestuffs containing at least two azo-groups of the general formula

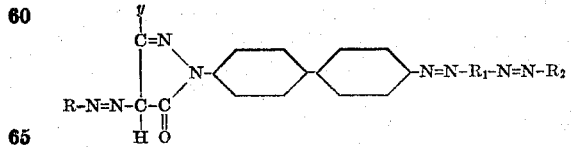

in which $y$ stands for a member of the group consisting of H, methyl, phenyl, COOH and COO— alkyl, R stands for a nucleus of the benzene series substituted in ortho-position to the —N=N— group by a substituent selected from the group consisting of OH and COOH groups, and $R_1$ and $R_2$ stands for aromatic nuclei selected from the group consisting of aromatic nuclei of the benzene and naphthalene series, which dyestuffs are soluble in water with formation of yellow to orange, to brown, to blackish and to green solutions, and dyeing the fiber similar tints of good fastness.

7. The complex metal compound of the sulfonated asymmetrical azo-dyestuffs containing at least two azo-groups of the general formula

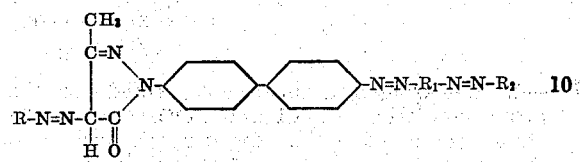

in which R stands for a nucleus of the benzene series substituted in ortho-position to the —N=N— group by a substituent selected from the group consisting of OH and COOH groups, $R_1$ and $R_2$ stand for aromatic nuclei selected from the group consisting of aromatic nuclei of the benzene and naphthalene series, which dyestuffs are soluble in water with formation of yellow to orange, to brown, to blackish and to green solutions, and dyeing the fiber similar tints of good fastness.

8. The complex copper compounds of the sulfonated asymmetrical azo-dyestuffs containing at least two azo-groups of the general formula

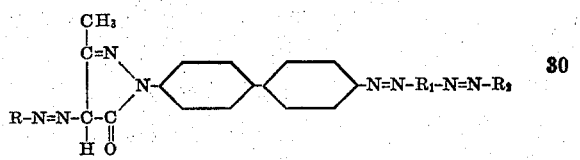

in which R stands for a nucleus of the benzene series substituted in ortho-position to the —N=N— group by a substituent selected from the group consisting of OH and COOH groups, and $R_1$ and $R_2$ stand for aromatic nuclei selected from the group consisting of aromatic nuclei of the benzene and naphthalene series, which dyestuffs are soluble in water with formation of yellow to orange, to brown, to blackish and to green solutions, and dyeing the fiber similar tints of good fastness.

9. The complex metal compounds of sulfonated asymmetrical azo-dyestuffs containing at least two azo-groups of the general formula

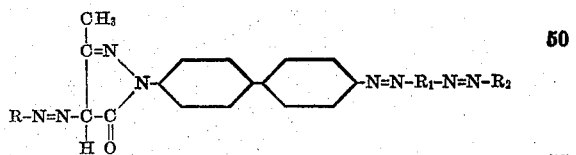

in which R stands for a nucleus of the benzene series substituted in ortho-position to the —N=N— group by a substituent selected from the group consisting of OH and COOH groups, $R_1$ stands for a nucleus of the benzene series and $R_2$ stands for a nucleus of the benzene series substituted in ortho-position to the —N=N— group by a OH group, which dyestuffs are soluble in water with formation of brown solutions, and dyeing the fiber brown tints of good fastness.

10. The complex copper compounds of sulfonated asymmetrical azo-dyestuffs containing at least two azo-groups of the general formula

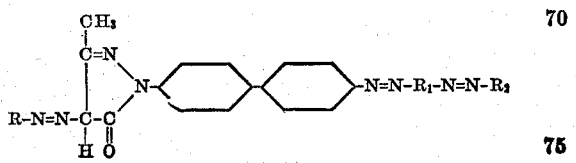

in which R stands for a nucleus of the benzene series substituted in ortho-position to the

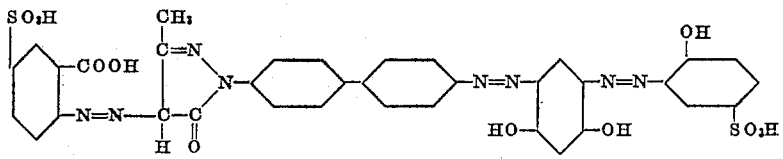

—N=N— group by a substituent selected from the group consisting of OH and COOH groups, $R_1$ stands for a nucleus of the benzene series and $R_2$ stands for a nucleus of the benzene series substituted in ortho-position to the —N=N— group by a OH group, which dyestuffs are soluble in water with formation of brown solutions, and dyeing the fiber brown tints of good fastness.

11. The complex metal compounds of the dyestuffs of the formula

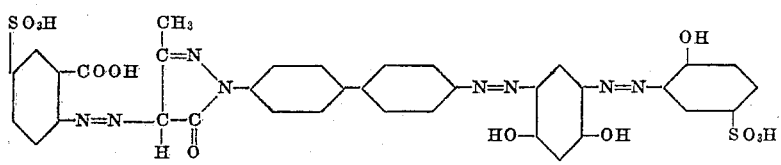

in which the diphenyl radical does not contain a substituent, which dyestuffs are soluble in water with formation of brown solutions, and dye cotton brown tints of good fastness.

12. The complex copper compound of the dyestuff of the formula in which the diphenyl radical does not contain a substituent, which dyestuff is soluble in water with formation of a brown solution, and dyes cotton brown tints of good fastness.

MAX SCHMID.